United States Patent [19]

Kullander

[11] Patent Number: 5,315,587
[45] Date of Patent: May 24, 1994

[54] DATA FLOW CONTROL

[75] Inventor: Jan Kullander, Göthenburg, Sweden

[73] Assignee: Telefonaktiebolaget L M Ericsson, Stockholm, Sweden

[21] Appl. No.: 955,412

[22] Filed: Oct. 2, 1992

[30] Foreign Application Priority Data

Oct. 4, 1991 [SE] Sweden .............................. 9102893-6

[51] Int. Cl.⁵ ......................... H04L 12/56; H04J 3/16
[52] U.S. Cl. ..................................... 370/60; 370/94.1
[58] Field of Search ................ 370/13, 60, 60.1, 94.1, 370/94.2, 17, 110.1, 58.1, 58.2, 58.3

[56] References Cited

U.S. PATENT DOCUMENTS

| | | | |
|---|---|---|---|
| 4,380,063 | 4/1983 | Janson et al. | 370/60 |
| 4,527,267 | 7/1985 | Cohen | 370/60 |
| 4,616,359 | 10/1986 | Fontenot | 370/60 |
| 4,696,000 | 9/1987 | Payne, III | 370/60 |
| 4,894,822 | 1/1990 | Buhrke et al. | 370/60 |
| 5,119,372 | 6/1992 | Verbeek | 370/60 |
| 5,130,986 | 7/1992 | Doshi et al. | 370/60 |
| 5,163,046 | 11/1992 | Hahne et al. | 370/60 |
| 5,193,151 | 3/1993 | Jain | 370/60 |

FOREIGN PATENT DOCUMENTS

| | | |
|---|---|---|
| 0374928 | 12/1989 | European Pat. Off. . |
| 432315 | 6/1991 | European Pat. Off. . |
| 446956 | 9/1991 | European Pat. Off. . |

Primary Examiner—Wellington Chin
Attorney, Agent, or Firm—Burns, Doane, Swecker & Mathis

[57] ABSTRACT

A method for monitoring and controlling the data flow in a packet data net or a datagram net comprising lines and nodes, the lines via nodes connecting by the network comprised terminals between which traffic takes place in the form of data packets or datagram. Every line and every node comprises a process preceded by a certain queue of data packets/datagram. Data packets are sent in to the net from the terminal for with a given frequency during a given time interval. If during this interval no throttling order is received from the following process, the frequency is increased by a given factor. This occurs successively until a given maximum frequency is reached. If on the other hand a throttling order is received during the interval, the frequency is instead reduced by a given factor which also occurs successively until no throttling order is received during an interval.

17 Claims, 5 Drawing Sheets

DATA FLOW CONTROL

TECHNICAL FIELD

The present invention relates to a method for monitoring and controlling the data flow in a packet data net or a datagram net and to a packet data net/datagram net respectively according to the pre-characterizing parts of claims 1 and 13 respectively.

Packet data-, and datagramcommunication means that information in the form of separate packets/datagrams is transmitted into a network formed by lines and nodes. (Datagram means short messages). (In the present application it is understood that line means either an ordinary "line" or a link (radiolink)).

Every node might thereby compromise one or more processes for controlling and monitoring the flow and direction of the packets. Normally the node comprises a buffer system for queueing and storing of packets. Every link between nodes is usually used by a number of competing packets. An advantage of a packet-datanet resides in that the lines are occupied by a user merely during the time it takes for a packet to be transmitted. This means that one expedient can be used at the same time by several users. If, however, a congestion occurs congested parts of the network will have to store a large number of packets in queues. Therethrough the performance of the network is lowered; packets might even "disappear".

One of the problems that may arise, particularly in the case of large networks comprising a large number of nodes and in the case where the network has to serve a large number of clients (sender/receiver) thus consists in that parts of the network may be overloaded due to lack of capacity as well in nodes as in lines. This may for example be the case when a large number of users wish to use the network simultaneously for traffic loading the same part of the network (i.e. node,-s or a line,-s). A congestion at one location in the network tends to spread if none or insufficient (incorrect) monitoring and controlling takes place. Overloading of a node may e.g. make the node restart and all information might disappear.

Different monitoring-, and control measures have been tried. In order to avoid all too big buffers a well adapted control of the traffic into the network is required to keep the need of buffering space at an adequate level.

STATE OF THE ART

In U.S. Pat. No. 4 616 359 a packet flow control method is described in which entry of and storage of information-data-packets in buffers is postponed until a test-, and test-return packet (permit-, permit-return packet), has been processed forth and back through the network. Shortly this means that before an originating terminal sends information data into the switching network it has to send a small control packet (permit packet) to the destination terminal. Not until as well all nodes and lines as the destination terminal itself have possibility and are prepared to accept an information data packet a test-return packet (permit-return packet) is sent back through the network to the originating terminal. Only as the test-return packet has been received, the originating terminal sends information data packets into the network. Therethrough, that the information data packets only are sent into the network as this as well as the receiver are ready, only a comparatively small buffer space is required in the different buffers since the need for storing of data packets is considerably reduced. As a control packet hereby arrives in a queue or to a storage buffer of a switching node, the node realises that the packet concerned is a control packet (permit packet). In the node the length of the queue is checked in order to determine if it exceeds a certain preestablished threshold value. If this is the case, the probability that there will be enough room for the information data packet in the queue and along the travelling way is small why the permit packet is discarded. After that a particular, for the originating terminal given time interval has elapsed, a new permit packet is generated at said terminal. If, on the other hand, the threshold value is not exceeded, the permit packet is prioritized in the queue in front of all data packets and is placed behind permit packets already present in the queue. The destination terminal receives permit packets if none of the queues or the buffers along the path in the network has been such that its threshold value has been exceeded. Even the destination terminal may discard a permit packet if it is not ready to receive data. On the other hand, i.e. if it is ready, a permit-return packet is generated. The permit-return packet is prioritized and is not discarded by any node on its way back through the network to the originating terminal. As this receives a permit-return packet, it sends a specified number of data packets into the network for further transmittal to the destination terminal.

At the originating terminal a timer is started up on generation of a permit packet. If no response to this permit packet has been received in the form of a permit-return packet within a certain given time interval, a new permit packet is generated since no response within the time interval indicates that the packet has been discarded either in the node or at the destination terminal. At the same time the given time interval is doubled so that when a congestion is present, the network will not be flooded with permit packets. When a permit-return packet reaches the originating terminal, the timer is reset or the timing interval is halved or divided until it reaches a minimum value.

With this system a permanent controlling of the dispatching of packets is required depending on returning control packets which have to be analyzed. For a solution like this the network is loaded with superfluous information, time is wasted since a response (permit-return packet) has to be awaited. (Permit-, and permit-return packets respectively have to be sent all the way through the network from originating terminal to destination terminal and then back again). Furthermore, the given time interval which has to expire before a new permit packet may be sent away is gradually extended, which leads to further retardations.

EP-A-0 374 928 describes a system where a message is sent from a node to the originating terminal when there is a congestion whereupon the terminal reduces the flow of packets. This message is added to a data packet which has arrived at the node where congestion is present in the form of an indicator. When the congestion has ceased a message about this is sent to the originating terminal from the node in question either automatically or as a response to a dispatched so called "polling packet". As a response to a polling packet a response may even be sent saying that congestion is present. These polling packets can be sent out with a certain periodicity after a first message about congestion has been received.

This system has evident drawbacks, among others due to the fact that an overloaded node must have control over which terminals have been throttled in order to be able to send a message about ceasing congestion so that they may start sending again. The polling packets which are dispatched furthermore are not comprised by any variable time-out-arrangement.

SUMMARY OF THE INVENTION

The present invention has as an object to achieve an optimal transmission of data packets/datagram within a network, the delay being minimal and the lines and the nodes of the network not being loaded with unnecessary information through a monitoring/control of flow and which works so that only those terminals loading an overloaded node or line are throttled. It is understood that congestion of a node/line may not lead to restarting of the node. These objects are achieved and others advantages are attained through a flow control as characterized in the claims 1 and 13. Preferable embodiments of the invention are given by the characteristics of the sub claims. Furthermore, for the invention, preferably the retardation of a packet, from originating to receiving, or return, may not exceed a certain time limit for a certain (important) part of the packets. Furthermore, the effects of a congestion in one part of the network will be limited to as few nodes and lines as possible.

Furthermore, the overhead of the flow control (none-user-traffic) has to be kept at an, for attaining the objects, acceptable level which is as low as possible.

That thus, according to the invention no information that no congestion is present or so called positive acknowledge, is required for not only maintaining the sending intensity to the previous extent but also to an increasing extent so to say automatically, where further traffic in the network only is required when there is a congestion, gives a faster and more efficient exploitation of the network.

BRIEF DESCRIPTION OF THE DRAWINGS

In the following the invention is more thoroughly described referring to the accompanying drawings, where.

DESCRIPTION OF PREFERRED EMBODIMENTS

Potentional bottlenecks in the network consist in nodes and lines. For reasons of simplicity every line and every node is seen as a process (hereinafter called line-, and routing process respectively). The line process thereby takes care of the transmission of packets on the line whereas the route selection process (also called routing process) decides to which line a certain packet is going and makes packet controls (i.e. it examines if a sending terminal may send a packet to a particular receiver and so on—by this is thus not meant checking of queue length).

A number of factors have an effect on how long a queue at a process may be, among others the capacity of the process, to which extent this capacity is to be exploited, how long network delays that can be tolerated and which probability for the returning of a packet that can be accepted. (This is further illustrated below through tables 6a, 6b).

Figure 1:
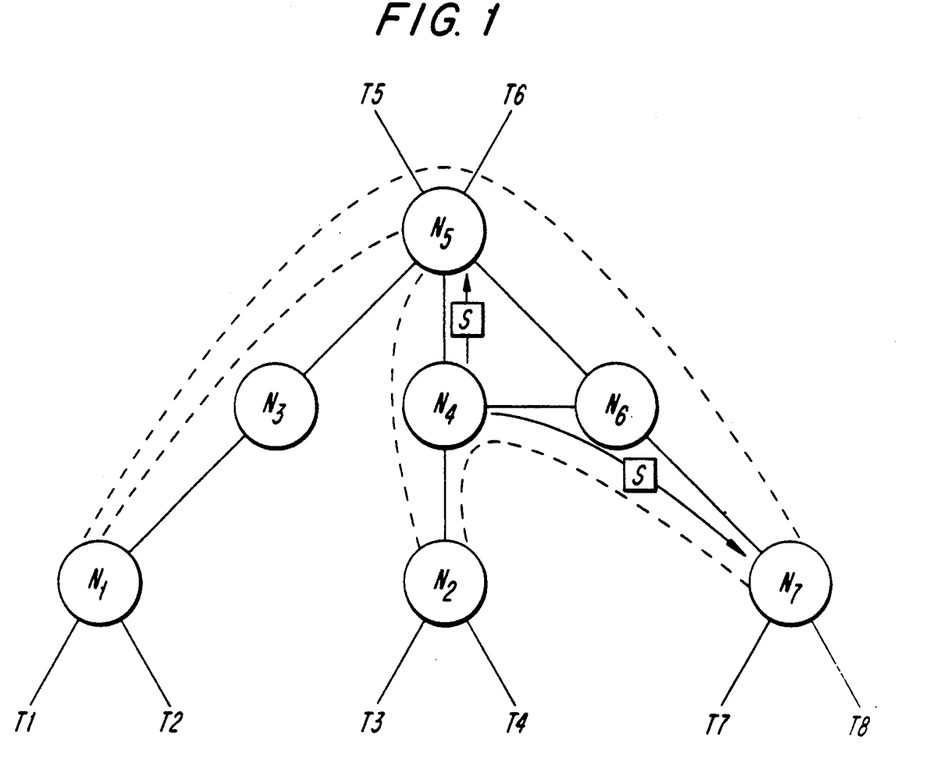
FIG. 1 shows an example of a network configuration of sending and receiving terminals, one of the nodes suffering a lack of capacity.

In FIG. 1 a network is shown comprising the terminals T1-T8 which communicate with each other via the nodes N1-N7 in the following way which also is illustrated by a dashed line in the figure: T1 communicates with T6 via N1, N3 and N5; T5 communicates with T3 via N5, N4 and N2; T7 communicates with T2 via N7, N6, N5, N3 and N1 and finally T8 communicates with T4 via N7, N6, N4 and N2. If thereby, expressed in a simple way, the node N4 would suffer a lack of capacity, a congestion packet (marked s in the figure) is sent to N5 and N7 which thereupon reduce the flow in from terminals T5 and T8 respectively. In this way terminals, which do not contribute in loading the node, are not affected by having to reduce their flow intensity.

Figure 2:
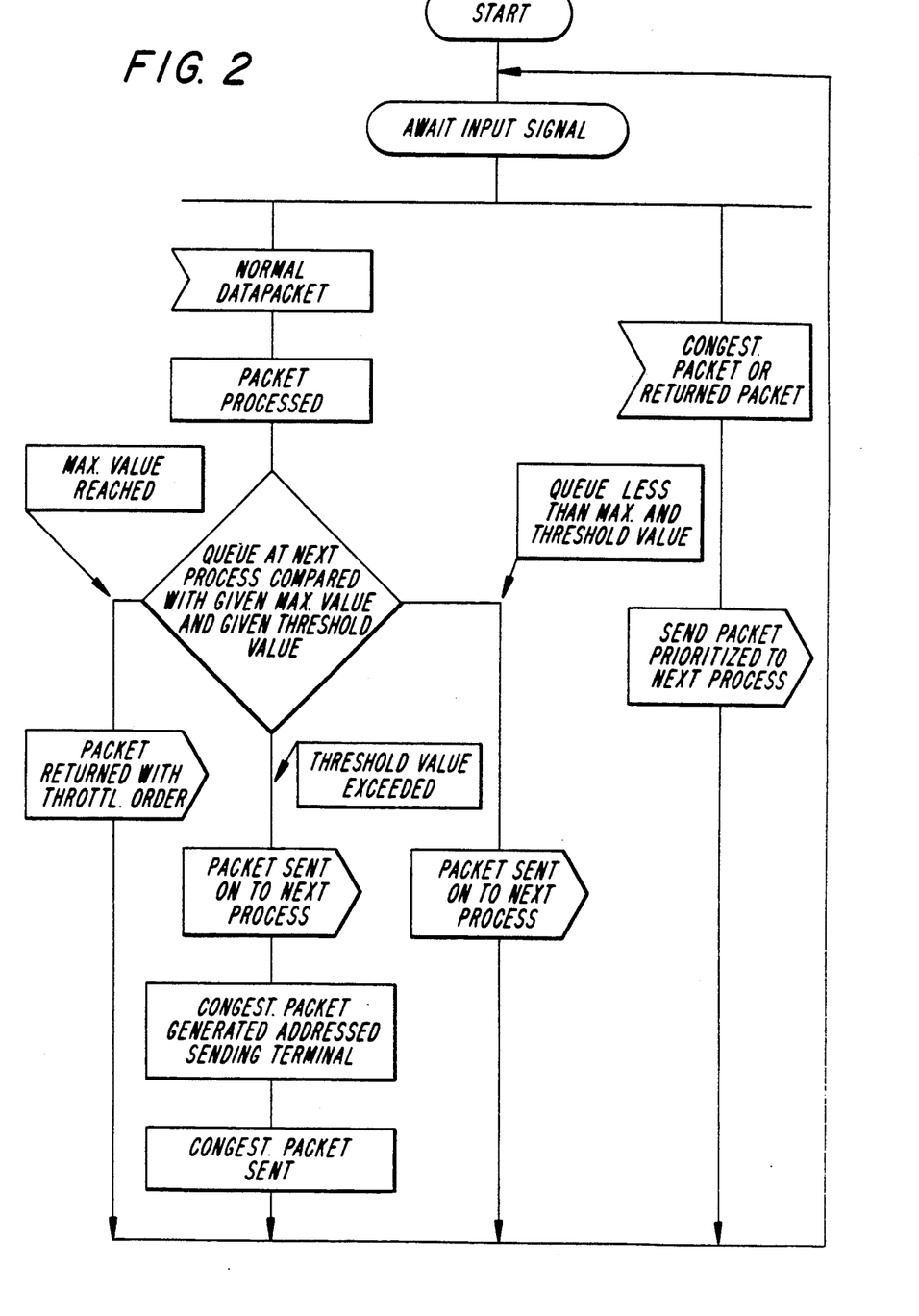
FIG. 2 shows a flow chart illustrating a line-, or a routing process.

FIG. 2 intends to illustrate the processing in a line-, or routing process. The principle can generally be said to consist in that the process that precedes an overloaded or congested process detects the overload/lack of capacity through examining on one hand how many packets that are being processed and on the other hand the length of the queue (i.e. the number of packets waiting in the queue). If the process thereby recognizes that there is a risk of congestion and that the degree of processing for example approaches 100%, the number of packets from the loading terminal has to be decreased. A congestion packet is then sent to the process which precedes the congested one in the direction of the originating terminal or upstreams. In this process as in any other process on its way to the originating terminal the congestion packet is prioritized before normal information data packets. Thereafter the sending terminal reduces its flow in. If the queue at a process in spite of everything would be filled, the packet will be returned to the sending terminal provided with a congestion indicator. If however the sending terminal does not receive a congestion order within a certain given time interval ($\Delta T$) (a so called time-out arrangement) this terminal will increase its flow in. The degree of increase (i.e. the extent to which the inflow of packets is increased when there is no congestion order during the time interval $\Delta T$ conveniently corresponds to the degree of decrease (the reduction to which a congestion packet gives rise). It is however also possible to use different reduction factors and increasing factors for a particular terminal (as well as for different terminals; The reduction factors/increasing factors are adjustable in the network and lies preferably between 1-10%, particularly around 10%, although it is sometimes useful to have a factor of about 1% or even less. However, also other values are possible e.g. higher if that is needed). It is customary that different terminals have different priority. This is preferably arranged through giving different terminals different degrees of decrease, high priority corresponding a lower degree of decrease.

For every terminal is given a degree of decrease/degree of increase as well as a value for $\Delta T$. As illustrated in FIG. 2 the process is initiated by awaiting an input signal. The input signal may either comprise a normal data packet or a throttling order in the form of a returned data packet or a congestion packet (so called congest packet). In the first case (i.e. the input signal comprises a normal (arriving) information data packet), the packet is first processed whereby, if it is a line process, it is transmitted along the line or if it is a routing process general controls and routing take place. Thereafter the queue at the next process is checked. Three circumstances are thereby possible. One possibility resides in the queue being filled, a given value for maximum queue is reached. The packet is then returned to its originating terminal provided with a congestion indicator.

A second possibility resides in the length of the queue passing a certain given threshold value, a so called high watermark. The packet is then sent on to the next process. Furthermore a congestion packet (a so called congest packet) is generated which is sent away to the sending terminal (this is possible since every incoming packet carries with it information about its sending address and entry node).

Finally the length of the queue may fall below the given threshold value which stands as a limit for measures to be taken. In this case the packet is sent on to the next process.

In the case that the input signal comprises a congestion packet (congest packet) or a returned packet this is sent on prioritized towards the originating terminal. Finally the whole procedure is repeated with once more awaiting a new input signal and so on.

Figure 3:
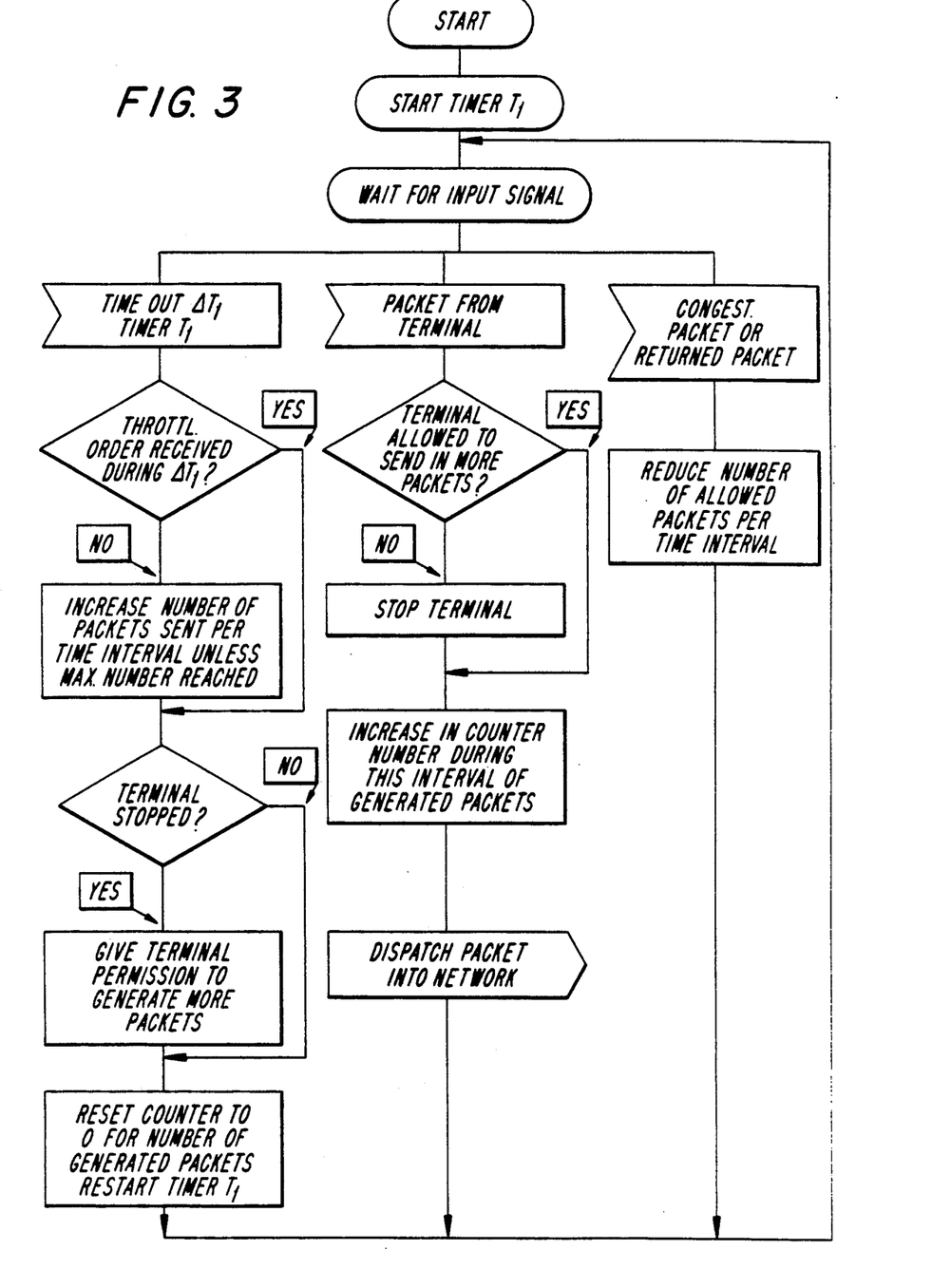
FIG. 3 shows a flow chart illustrating a processing at an originating terminal or at network connection.

In FIG. 3 the process at a sending terminal or a corresponding network connection is illustrated. To begin with a timer, $T_1$, is started whereafter an input signal is awaited. Generally it can be said that this input signal may be of three different kinds. The input signal may be consist in that the in the timer $T_1$ preset timing interval, $\Delta T_1$ has elapsed or expired (a so called time-out-arrangement). It is observed if a throttling order (i.e. a returned data packet or a congestion packet) has been received during the time interval. If no throttling order has been received, the number of packets which are sent away per time interval is increased by a certain factor unless a given maximum number of packets per time interval already has been reached in which case this frequency is maintained.

Thereafter it is examined if the terminal is stopped; if this is the case it is allowed to generate more packets. A counter for the number of generated packets is set back to zero and the timer $T_1$ is started again awaiting a new input signal. If however a throttling order has been received during the time interval $\Delta T_1$ it is also examined if the terminal is stopped—if yes, it is allowed to generate more packets, if the terminal is not stopped, the counter is set back to zero and the timer $T_1$ is restarted again.

The input signal may also comprise a data packet from a terminal. It is thereby checked if the terminal may send more packets. One is interested in finding out the number of packets that may be sent during a certain period, i.e. if the terminal, including the just received packet, already has sent its maximum of allowable packets for the concerned period. If this is the case, the terminal is stopped from generating more packets during the period. Otherwise it is allowed to go on. In both cases, the number of generated packets during this period is added in the counter and the packet is sent into the network.

Finally the input signal may comprise a congestion packet or a returned packet. The number of packets that may be generated during a period is then reduced and a new input signal is awaited, said signal being any of the here described kinds whereafter the procedure is repeated.

Figure 4A:
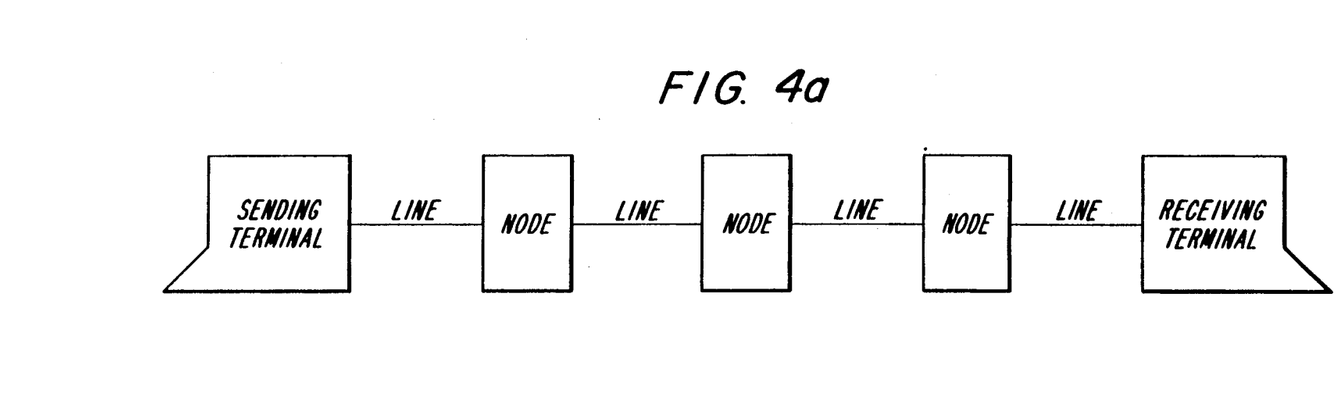
FIG. 4a shows a physical picture of the path of a packet through the network.
Figure 4B:
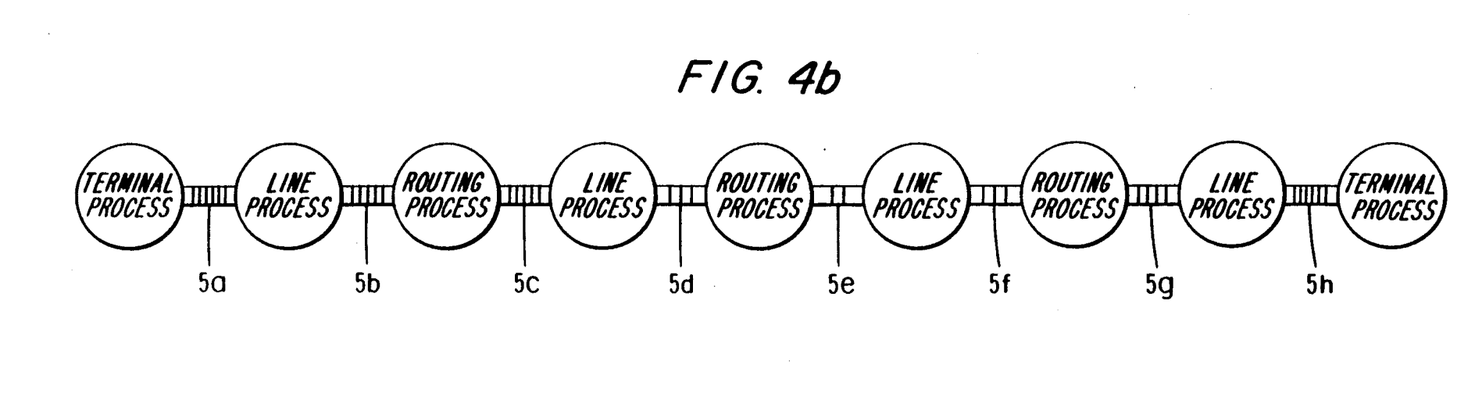
FIG. 4b shows the corresponding logical picture of the path of a packet through the network.

In FIG. 4a and 4b respectively, is illustrated physically and logically respectively the path of a packet through a network which is strongly simplified in so far that it only shows one sending and one receiving terminal whereas in reality a number of sending as well as a number of receiving terminals are concerned. It can however be seen how every line and every node respectively is corresponded by a line process and a routing process respectively, said every process being preceded by a queue (5a–5h) of a varying length and with varying queue space.

FIG. 1 shows schematically an example of how a network comprising a number ($T_1, T_2, \ldots$) of sending and receiving terminals respectively may look.

For an optimally working network it is of importance that accurate values are chosen for queue-lengths, $K^{max}$, threshold value $K^u$ (the value of the length of the queue at which a congestion packet is generated and sent away), preset time intervals, $\Delta T$ for timer (time-outer) as well as degree of decrease/degree of increase.

The threshold value $K^u$ is adjustable. According to one embodiment $K^u$ is about 20, but a number of other values are of course possible.

As to the timer, a short given time interval $\Delta T$ gives a comparatively faster recovery at varying load. At the same time a greater number of throttling orders are required in order to keep the balance in an overloaded network.

According to one example around 100 terminals are loading a certain node or line. Upon congestion it is thereby required that a congestion packet (congest packet) is sent to every terminal every time-out-period. If the timer is preset to 10 seconds, 10 congestion packets have to be sent per second. A further parameter is the degree of decrease per congestion packet, i.e. the factor with which the number of packets to a node/line from a certain, loading terminal, has to be decreased. A lower degree of decrease (in percent) thereby gives a higher degree of exploitation of the node. A low degree of decrease requires more congestion packets upon quick changes in load. In the given example a degree of decrease of about 10% may be given.

This may however be chosen differently as well generally in the network or it may vary from terminal to terminal in order to in that way give different priority to different terminals. A high priority corresponds to a low degree of decrease.

In the following a description is given of among others the signalpaths in the node, detection of lack of capacity, throttling and blocking (returning of data packets) as well as certain parameters.

Figure 5:
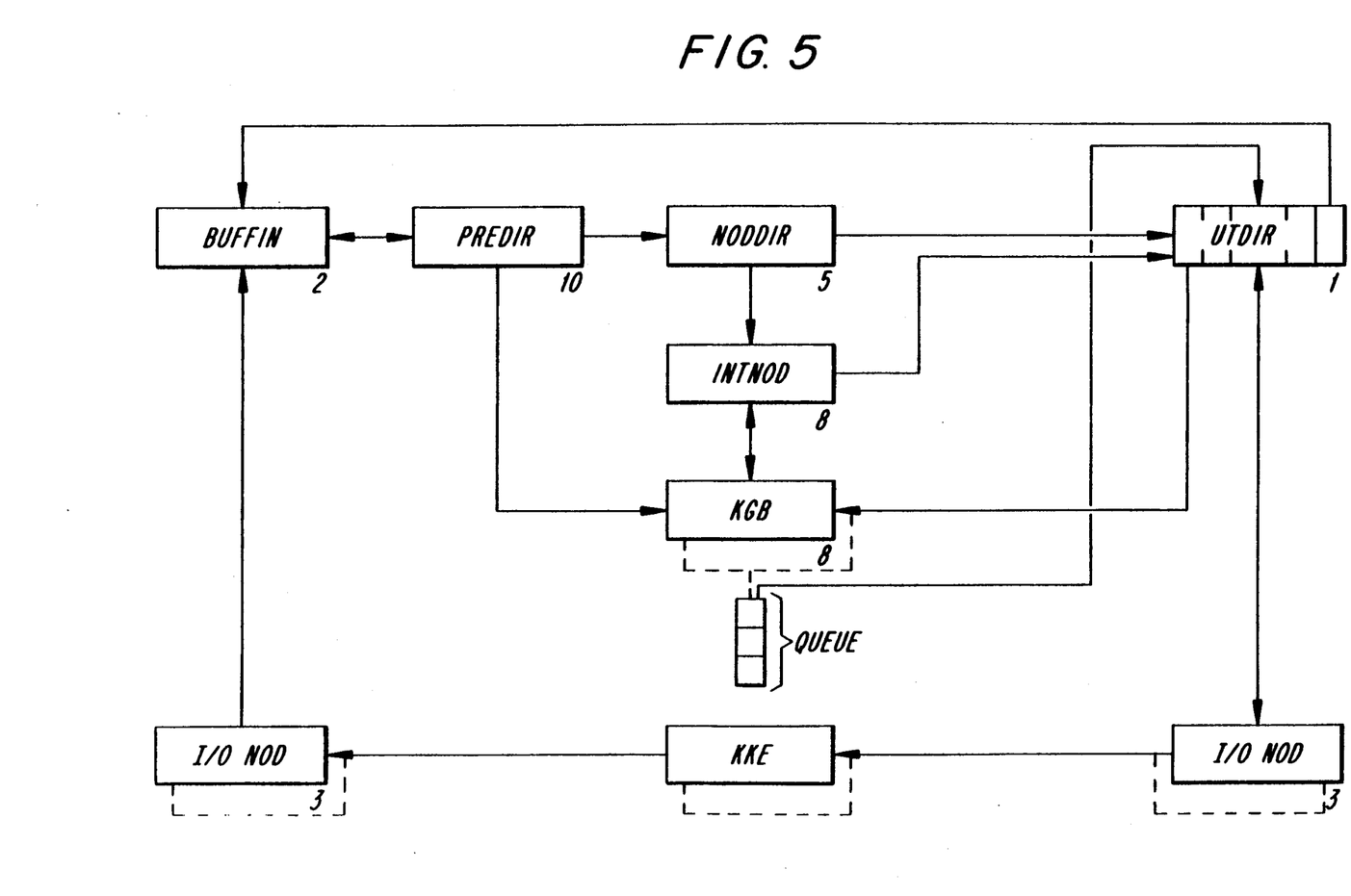
FIG. 5 shows an example of signal paths in the node.

FIG. 5 illustrates the signal paths in the node according to one embodiment.

(Dashed lines means that there are more than one level.)

With a channel is meant either a logical channel or a physical line. With a connection one or more channels between two units (node-node, node-FST (Line Connected Terminal), node-NCC (Network Control Center) is meant. The word connection is also used to refer to a radio link. Furthermore, the word line is used to mean either an ordinary line or a (radio) link.

If a node detects that it lacks CPU or path out capacity it has to reduce the inflow of traffic. The node tries to detect the origin of the traffic which to the highest degree loads the process lacking capacity. The source (fix terminal or logical base) of the loading traffic is then throttled, either directly or indirectly. Direct throttling means that the sending intensity of the subscribers into the net is reduced. With indirect throttling is meant an order from one node with lack of capacity to another node to congest in the manner described above. Certain node processes can block traffic if their internal queues are so filled that they can not accept any more signals. Blocked traffic is returned back to the sender (returned packet) or cancelled.

BUFFIN (buffer for incoming traffic) is a task comprising an internal queue. The length of this queue in a certain moment is a measure of how well the node manages to take care of the offered traffic.

All signals which will have an influence on the flow control send I/O NOD (In/Out Node) to BUFFIN. Two kinds of counters decide if the communication blocks are allowed to send signals to BUFFIN. On one hand a total counter showing the total number of further signals which can be sent to BUFFIN; BUFFIN reduces its value when a signal which has come in via input is added to the internal queue and increases the value at a successful SS output. The function of this counter is to control that the node does not accept more traffic than it manages to take care of and to give an indication on when it is adequate to limit or reduce the traffic inflow. When the value in the counter gets $<=0$ BUFFIN sets a global flag, below called the total flag, false. The flag is not set true until at least five positions in the internal queue of BUFFIN have become free. On the other hand counters are provided, one for each channel. These counters are set every tenth second of the communication block respectively to a certain value which may be different for different channels. This value, which is globally given by BUFFIN should initially be regulated to the nominal velocity and of concerned channel its protocol. Initial values are given per channel in configuration (not illustrated).

I/O NOD decreases the value of the counter at output. These counters are used for controlling the flow in of traffic from a particular channel. In order to reduce the risk of inflow in "batches" into main the communication blocks start upon initiation their channel timers randomly within an interval of ten seconds. However, a started timer always has a period of ten seconds in the described embodiment.

I/O NOD controls both the total flag of BUFFIN and the counter of the channel after it has sent a signal to BUFFIN. If the total flag is false, all channels in the communication block are stopped. If the counter of a particular channel $<=0$, that channel is stopped.

If one individual channel has been stopped because the channel counter has become zero, the traffic is restarted (if the total flag shows true) as the channel timer starts and the counter is reset. If all channels have been stopped due to the total flag, the communication block controls when the timer of a channel changes, if the total flag is true. If this is the case, the traffic of the channel in question is turned on.

The addresses of the total flag and the throughput values are given to BUFFIN and respective com block with the initiation signal from an internal task.

As to the traffic out, the signals are arranged in queues in UTDIR (responsible for directing to correct line/link). There is one queue for every connection plus one queue per KGB (Logical Base Handler).

For each channel and KGB there is a counting semaphore which is reduced by UTDIR when it sends signals to KGB/I/O NOD and KGB/I/O NOD increases when they in their turn are dispatching a signal. If this counter shows zero UTDIR does not deliver any signal. In order to keep control of possible drift in the counter the KGB/communication blocks control the value of the counter if they have not received any signal from UTDIR during e.g. one minute. If the value is zero the counter is updated to its initial value and then an alarm is sent. Furthermore, the communication blocks/KGB check to determine every time the counter is increased that it does not exceed the initial value. KGB sends packets to KKE via UTDIR. The directing of packets which are to come out on radio consequently will be UTDIR - KGB - UTDIR - COMBLOCK - KKE. (KKE is a Channel Control Unit).

The addresses of the counting semaphores are given to UTDIR as well as KGB I/O NOD respectively with the initiating signal from abovementioned internal task.

For the intraffic KKE simulates UTDIR from the viewpoint of the communication block (HDLC), (CCITT-HDLC). As the KKE sends a signal to HDLC it counts down the corresponding channel counter. If the counter shows zero the packet is returned. If the KKE merely is an up-channel it can not return the packet. In this case it does not acknowledge the packet as long as the counter is zero.

The addresses of the counting semaphores decides KKE and gives HDLC information thereon in an initiating signal.

For the outtraffic KKE simulates BUFFIN from the viewpoint of the communication block (HDLC). KKE thus shows values on sending intensity per channel. The values are the ones that are given in config (configuration data, not illustrated) and does never change. Furthermore, the KKE shows a forever true total flag.

The addresses of the total flag and the throughput values give the KKE and gives HDLC information thereon in an initiating signal.

Upon node-internal processing of traffic PREDIR (directs, selects packets of internal formate (to KGB) and external formate (to NODDIR)) goes through a certain maximal number of signals per time interval. This maximum number is a system parameter. As soon as PREDIR, which has the lowest priority of the tasks of mains, gets CPU-time, it asks BUFFIN for a signal. Packets coming from a KKE in the own node sends PREDIR to KGB further packets to NODDIR to be sent further on. If at least one of the following two conditions are met, PREDIR does not take any signal from BUFFIN:

PREDIR has during the last period (the length of which is still not given) already taken care of as many signals per time interval as it is allowed to.

the length of a queue in a subscribers register called ABREG, not illustrated, exceeds a certain value. PREDIR checks this length through a call.

The different processes have different priority, for example graded 1-10, where 1 corresponds to the highest priority whereas 10 corresponds to the lowest priority. In INTNOD (checking and controlling packets, routing) as an example ABREG has the priority 6, which is higher than that for the other processes. The higher priority is given since there is a wish to, as soon as possible, get the possible bottle neck ABREG to work.

The numbers in FIG. 5 thus indicates priorities. E.g. UTDIR has a high priority (1). This means that the line should be busy to an as large extent as possible—all the time—in order to get packets away from the node. PREDIR has a low priority (10) which (in a simplified way) means that packets should not be entered, but to a small extent—the ones already present should first be processed.

In principle a node should throttle its flow in of signals when it lacks capacity. A lack of capacity is present when the queues at BUFFIN or UTDIR are filled up to 50% or more and are increasing. In BUFFIN the total queue is supervised whereas in UTDIR the queue of every connection is supervised. In the later case the queues at KKE's are excepted since they may comprise signals which can not be understood by UTDIR. However, KGB has an own flow control which merely accepts only a certain number of packets waiting at KKE. Possible lack of capacity will thus propagate back to KGB and be revealed in its queue. Lack of capacity leads to the node taking any kind of controlling measure, either throttling of a connection or a blocking of signals (blocking of a signal will also result in a throttling of its sender).

In BUFFIN signals are not blocked. The total counter/total flag takes care of the internal queue of BUFFIN not getting overfilled. As a controlling measure has been taken it takes a while before it gets an effect on the flow in of traffic. The time it takes from the moment when a controlling measure has been taken until it is possible to be (quite) sure that it has had an effect is below called the integration time. The integration time is used in certain algorithms, e.g. in order to increase the throughput of a throttled connection. In this embodiment an integration time, $\Delta T$ of 10 seconds is used.

PREDIR gives the upper limit of the capacity of a node.

Throttling means that the throughput of a radio-link or a line to a fix terminal is decreased.

Every time that BUFFIN/UTDIR puts a signal in an internal queue it is checked if the queue length exceeds the limit for throttling and if the queue in this case is longer than the last time a signal was put in. If both these conditions are met, throttling has to take place. What is to be throttled is the sender of the last arrived packet able to be throttled. It must also be checked up that the sender is not e.g. the Mobitex-network itself or any gateway since they do not get congested in this revision.

The intention is that those logical bases (throttling objects) are to be throttled which most load the concerned queue. Through the above procedure it is probable that the "correct" object is throttled. Simulations that have been done implies that a throttling of the last arrived signal gives as good a result as going through the whole queue in order to find the most frequent sender (loader).

Throttling of an object which is not directly connected under the node which will throttle, takes place through the sending of a so called throttling order. The throttling order points out the fix subscription or the logical base which is to be throttled. The throttling order is node-addressed to the node to which the throttling object is connected.

BUFFIN as well as UTDIR may generate throttling orders on basis of the content of the respective queue. The throttling order of UTDIR is always sent to BUFFIN to be sent on therefrom.

BUFFIN prioritizes throttling orders either self generated or received ones, through placing them at the top of its queue. This has the effect that the order will be sent on as soon as the node has finished processing the signals already existing between BUFFIN and UTDIR. The loss of time which arises therethrough instead of sending the signal directly to UTDIR is small. The gain of sending the throttling order via PREDIR is uniform treatment of all traffic.

As a throttling order reaches BUFFIN in the node to which the throttling order is addressed, BUFFIN itself throttles the object concerned if it is a fix terminal. If the object is a logical base, BUFFIN orders indicated KGB to throttle the inflow on the radio.

A fix terminal which is connected to the node where BUFFIN has detected a lack of capacity and wants to reduce the inflow i.e. throttling of an object on an own node, is directly throttled without any throttling order having to be sent. If a logical base on the own, throttling node, is to be throttled an order thereon is sent to the KGB in question. If it is UTDIR that has detected a lack of capacity, UTDIR sends the throttling order to BUFFIN for further measures to be taken.

One intention with the way to throttle which is described below, i.e. reducing the throughput/sending intensity, is to avoid completely stopping a channel. Logical bases are throttled only a tenth of that of fixed terminals (per throttling occasion). This is due to the fact that also "innocent" subscriptions will be affected in the case of a logical base. Throttling of a FST (fix terminal) is caused through reduction of the value of the channel counter of the fix terminals with 10%. Thereupon the received value is rounded off downwards to the closest integer not less than 1. This rounded off value is the value that BUFFIN shows the communication blocks. Continuous calculation of throughput however takes place using the not rounded off value.

When KGB receives a throttling order a throttling command is sent to all system channels.

Similar to the com blocks the KKE has a maximum number of signals that it may receive during a period of 10 seconds. Those signals that arrive during such a period of seconds after that the maximum number of signals already have been received are not responded to.

Eventual throttling of a KKE takes place with 1%. Throughput is set through changing of the maximum number of signals per period of 10 seconds and calculated in the same way as for a fix terminal (see above). If no further throttling has occurred on a throttled channel during a time which is at least twice the integration time, the throughput/sending intensity for the channel may be increased. The magnitude of the eventual increase corresponds to that of the previous throttling.

If the channel is throttled, it is checked every time the timer of the semaphore of the channel if the throughput can be increased again. The increase is 1/(1-throttling), i.e. about 11%. Having reached the initial value of the channel given in config, no further increase takes place.

With blockage is meant that the queue is filled and that there is no room for the packet concerned task (UTDIR) holds. When the queue is filled some measure must be taken. This measure is to return or discard some packets.

The basis of UTDIR for deciding which packet which is to be blocked lie in the signals which for the moment are present in the concerned queue.

Different packets in the net are divided into different blocking classes. At a blocking, packet types within one and the same blocking class are treated equally. Thus there is no prioritizing within the blocking class, but only between different blocking classes.

The packet which is to be blocked will be in the lowest blocking class which is present in the concerned queue. If there are many packets of the same blocking class, the one is chosen which is at the top of the queue. This is due to the fact that it is wished to keep as many adequate packets as possible and to choose between at an eventual further blockage. As it has been decided which packet is the most convenient to block, the next measure depends on to which blocking class the packet belongs. Some blocked traffic is sent node-addressed to the entry node of the packet in the network.

The parameters which are hard coded are among others given by:
- the length of the internal queue of BUFFIN
- how often the channel counter of the communication blocks/KKE's are to be set
- the magnitude of the internal queues of UTDIR
- the integration time
- how many percent decrease of sending intensity throttling gives
- how often control of possible increase of sending intensity is to take place
- CONFIG—parameter that gives maximum number of packets treated by a node per time unit (indirectly set—depends on node type and hardware).

Parameters which are adjustable from NCC/NODOP:
- if a congestion order may be dispatched from a particular node
- if a congestion order may lead to a congestion of fix terminals/logical bases on a certain node.

In the tabels I and II shown below concerning length of queue obtained at different loads the calculations are done theoretically under the approximation that as well the inflow as the treatment times are Poisson-distributed (exponentionally distributed).

The occupational degree thereby gives the number of arriving packets per time unit divided by the number of packets per time unit that the treating in process (line-, or routing process) can handle.

The queue length defines the number of packets that can be stored waiting for processing.

Blocking in percent gives the share of the incoming packet stream that has to be returned due to a filled queue. The number of packets in the queue is finally given by the expected value (average value) of the number of packets present in the queue waiting for processing. An advantageous embodiment is given by a queue comprising about 20 positions. This makes it essentially free of blocking up to an occupational degree of about 0,9 and a blocking of about 4,5% at a maximally loaded process. At occupational degrees of up to 0,9 which can be seen as an objective, the expected value of the number of packets in the queue is maximum 6.

The majority of processes have a capacity of at least one packet/second. This gives a delay of maximally 6 seconds per process.

TABLE I

| Occu-pational degree | Length of queue = 1 | | Length of queue = 2 | | Length of queue = 3 | |
|---|---|---|---|---|---|---|
| | No of packets in queue | Block-age in % | No of packets in queue | Block-age in % | No of packets in queue | Block-age in % |
| 0.5 | 0.1 | 14.3 | 0.3 | 6.7 | 0.4 | 0.8 |
| 0.6 | 0.2 | 18.4 | 0.4 | 9.9 | 0.7 | 1.9 |
| 0.7 | 0.2 | 22.4 | 0.5 | 13.5 | 1.0 | 3.8 |
| 0.8 | 0.3 | 26.2 | 0.6 | 17.3 | 1.4 | 6.6 |
| 0.9 | 0.3 | 29.9 | 0.7 | 21.2 | 1.8 | 10.2 |
| 1.0 | 0.3 | 33.3 | 0.8 | 25.0 | 2.1 | 14.3 |
| 1.1 | 0.4 | 36.6 | 0.8 | 28.7 | 2.5 | 18.7 |
| 1.2 | 0.4 | 39.6 | 0.9 | 32.2 | 2.8 | 23.1 |
| 1.3 | 0.4 | 42.4 | 1.0 | 35.5 | 3.1 | 27.5 |
| 1.4 | 0.4 | 45.0 | 1.0 | 38.6 | 3.3 | 31.6 |
| 1.5 | 0.5 | 47.4 | 1.1 | 41.5 | 3.5 | 35.4 |
| 1.6 | 0.5 | 49.6 | 1.2 | 44.3 | 3.6 | 39.0 |
| 1.7 | 0.5 | 51.7 | 1.2 | 46.8 | 3.8 | 42.2 |
| 1.8 | 0.5 | 53.6 | 1.3 | 49.1 | 3.9 | 45.2 |
| 1.9 | 0.6 | 55.5 | 1.3 | 51.3 | 4.0 | 47.9 |

TABLE II

| Occu-pational degree | Length of queue = 10 | | Length of queue = 20 | | Length of queue = 50 | |
|---|---|---|---|---|---|---|
| | No of packets in queue | Block-age in % | No of packets in queue | Block-age in % | No of packets in queue | Block-age in % |
| 0.5 | 0.5 | 0.0 | 0.5 | 0.0 | 0.5 | 0.0 |
| 0.6 | 0.9 | 0.1 | 0.9 | 0.0 | 0.9 | 0.0 |
| 0.7 | 1.5 | 0.6 | 1.6 | 0.0 | 1.6 | 0.0 |
| 0.8 | 2.3 | 1.8 | 3.0 | 0.2 | 3.2 | 0.0 |
| 0.9 | 3.4 | 4.4 | 5.7 | 1.2 | 7.9 | 0.0 |
| 1.0 | 4.6 | 8.3 | 9.5 | 4.5 | 24.5 | 1.9 |
| 1.1 | 5.7 | 13.3 | 13.1 | 10.4 | 40.4 | 9.2 |
| 1.2 | 6.5 | 18.8 | 15.4 | 17.0 | 45.0 | 16.7 |
| 1.3 | 7.2 | 24.1 | 16.7 | 23.1 | 46.7 | 23.1 |
| 1.4 | 7.7 | 29.1 | 17.5 | 28.6 | 47.5 | 28.6 |
| 1.5 | 8.1 | 33.6 | 18.0 | 33.3 | 48.0 | 33.3 |
| 1.6 | 8.4 | 37.6 | 18.3 | 37.5 | 48.3 | 37.5 |
| 1.7 | 8.6 | 41.2 | 18.6 | 41.2 | 48.6 | 41.2 |
| 1.8 | 8.8 | 44.5 | 18.8 | 44.4 | 48.8 | 44.4 |
| 1.9 | 8.9 | 47.4 | 18.9 | 47.4 | 48.9 | 47.7 |

The invention is applicable as well in radiocommunication systems where the nodes communicate through radiolinks as well as systems where the communication takes place via cables. The invention is not limited to shown embodiments but can be freely varied within the scope of the claims.

What is claimed is:

1. A method for monitoring and controlling dataflow in a packet data network or a datagram network comprising a plurality of lines and a plurality of nodes, the lines connecting a plurality of terminals with each other via the nodes, the lines and nodes forming paths through the network, between which terminals flow data packets/datagrams, every line and every node respectively comprising a line process and a routing process respectively preceded by a queue of data packets/datagrams and loading terminals among the plurality of terminals sending in data packet/datagrams into the network with a respective frequency during a respective time interval, comprising the steps of sending data packets/datagrams directly into the network without preceding control-packets with frequencies which successively increase at a predetermined rate for successive elapsed time intervals during which not throttling order was received from the line processes and routing processes, and sending data packets/datagrams with frequencies which successively decrease at a second predetermined rate for elapsed time intervals during which at least one throttling order has been received from the line processes and the routing processes.

2. A method according to claim 1, wherein the at least one throttling order comprises one of a returned data packet/datagram and a congestion packet.

3. A method according to claim 1, wherein every line process or routing process checks the queue length of following line processes or routing processes in the path of a packet through the network and each line process or routing process is given at least one of a maximum allowable queue length and a threshold value for the queue length whereby the reached maximum allowable queue length gives rise to a throttling order in the form of a returned data packet/datagram, and where the reaching of the threshold value gives rise to the generation of a congestion packet which is sent towards the loading terminals.

4. A method according to claim 3, wherein when the length of a line process or routing process reaches the maximum allowable queue length or the threshold value, a throttling order only is sent from such line process or routing process to the terminals which load such process.

5. A method according to claim 3, wherein the threshold value is adjustable.

6. A method according to claim 5, wherein the threshold value is adjusted to be approximately 20.

7. A method according to claim 1, wherein a throttling order in the form of one of a congestion packet and a returned packet is given priority in the queues of the line processes and the routing processes, respectively, which the packet has to pass on its way to the loading terminal.

8. A method according to claim 1, wherein a frequency reduction factor per received throttling order is the same as a frequency increasing factor when no throttling is received.

9. A method according to claim 1, wherein a frequency reduction factor per received throttling order is different from a frequency increasing factor when no throttling is received.

10. A method according to claim 1, wherein a frequency reduction factor per received throttling order and a frequency increasing factor when no throttling order is received are adjustable and approximately between 1-12%.

11. A method according to claim 1, wherein the frequency reduction factor and the frequency increasing factor are approximately 10%.

12. A method according to claim 1, wherein the respective time interval is the same for every one of the plurality of terminals.

13. A method according to claim 1, wherein the respective time interval is different for different ones of the plurality of terminals.

14. A method according to claim 1, wherein one of the plurality of terminals is given a predetermined priority through the choice of one of a frequency reduction factor per received throttling order and a frequency increasing factor when no throttling order is received.

15. A method according to claim 14, wherein the one of the plurality of terminals is given at least one of a frequency reduction factor and a frequency increasing factor which differs from the frequency reduction factors and frequency increasing factors of others of the plurality of terminals in order to obtain a higher or a lower priority.

16. A method according to claim 1, wherein an occupational degree is given by a number of arriving/datagrams per unit time divided by a number of packets/datagrams per unit time that a line process or a routing process can handle and a congestion packet is dispatched when the occupational degree of a line process or a routing process reaches more than 0.9.

17. A packet data net or datagram net comprising a plurality of lines and a plurality of nodes, the lines connecting a plurality of terminals via the nodes for sending data packets/datagram between the terminals, every line and every node comprising a process, comprising a queue space belonging to the process, for monitoring and controlling the packet traffic in the net in such a way that terminals loading such processes associated with nodes and lines can selectively be throttled, each terminal comprising a timer which is set to a certain time interval, a counter for controlling the number of data packets dispatched during the time interval and means for dispatching data packets with a certain given frequency, the packets sent away from ones of the plurality of terminals are provided with an indication of an address and whereby in every process the queue length at the following process in the direction of transmission of a packet is examined, wherein a maximum value of queue length and a threshold value of the queue length are given, the reaching of the maximum value of queue length gives rise to returning of incoming packets and where reaching of the threshold value gives rise to a throttling order, the process comprising means for generation of a congestion packet and means for providing a return packet with a congestion indication, each terminal being so equipped that for each time interval during which no throttling order has been received, the frequency is increased by a first given factor until a certain maximum frequency is reached and, for each time interval during which a throttling order has been received, the frequency is reduced by a second given factor per throttling order.

* * * * *